United States Patent [19]
Diaz

[11] 4,045,927
[45] Sept. 6, 1977

[54] WALL CONSTRUCTION

[75] Inventor: D. Angel Chocarro Diaz, Pamplona, Spain

[73] Assignee: Iberica del Frio S.A., Spain

[21] Appl. No.: 647,559

[22] Filed: Jan. 8, 1976

[51] Int. Cl.² .......................... E04C 2/40; E04B 1/40
[52] U.S. Cl. ........................................ 52/127; 52/403; 52/584; 403/7; 403/292; 403/409
[58] Field of Search ................. 52/309, 584, 585, 127, 52/403; 49/497; 403/7-9, 294, 296, 297, 292, 409

[56] References Cited

U.S. PATENT DOCUMENTS

| 2,540,468 | 2/1951 | Anderson | 52/585 |
| 3,178,984 | 4/1965 | Barothy | 403/296 X |
| 3,327,447 | 6/1967 | Nissley | 52/309 |
| 3,469,349 | 9/1968 | Multer | 49/489 X |
| 3,567,260 | 3/1971 | Norris | 52/584 X |
| 3,884,002 | 5/1975 | Logie | 52/585 X |

FOREIGN PATENT DOCUMENTS 1,133,931  11/1968  United Kingdom ................. 403/292

Primary Examiner—Alfred C. Perham
Attorney, Agent, or Firm—Robert E. Burns; Emmanuel J. Lobato; Bruce L. Adams

[57] ABSTRACT

A wall construction comprising a plurality of wall panel sections interconnected by an anchoring plate which has a frustoconical hole at each of two ends. The ends are disposed in anchoring or connecting side members mounted in respective, mutually juxtaposed panel sections. The plate is connected with these members by connecting bolts, each of which has a bolt end portion for screwthreaded engagement with one of the anchoring side members, and an intermediate frustoconical bolt portion engaging an associated frustoconical hole of an anchoring or retaining bar or plate, so that when the connecting bolts are screw engaged with respective side members the frustoconical bolt portions of the bolts are shifted relative to the holes in the anchoring plate, whereby adjacent connecting members, with their panel sections, are drawn together to bear tightly against one another.

8 Claims, 11 Drawing Figures

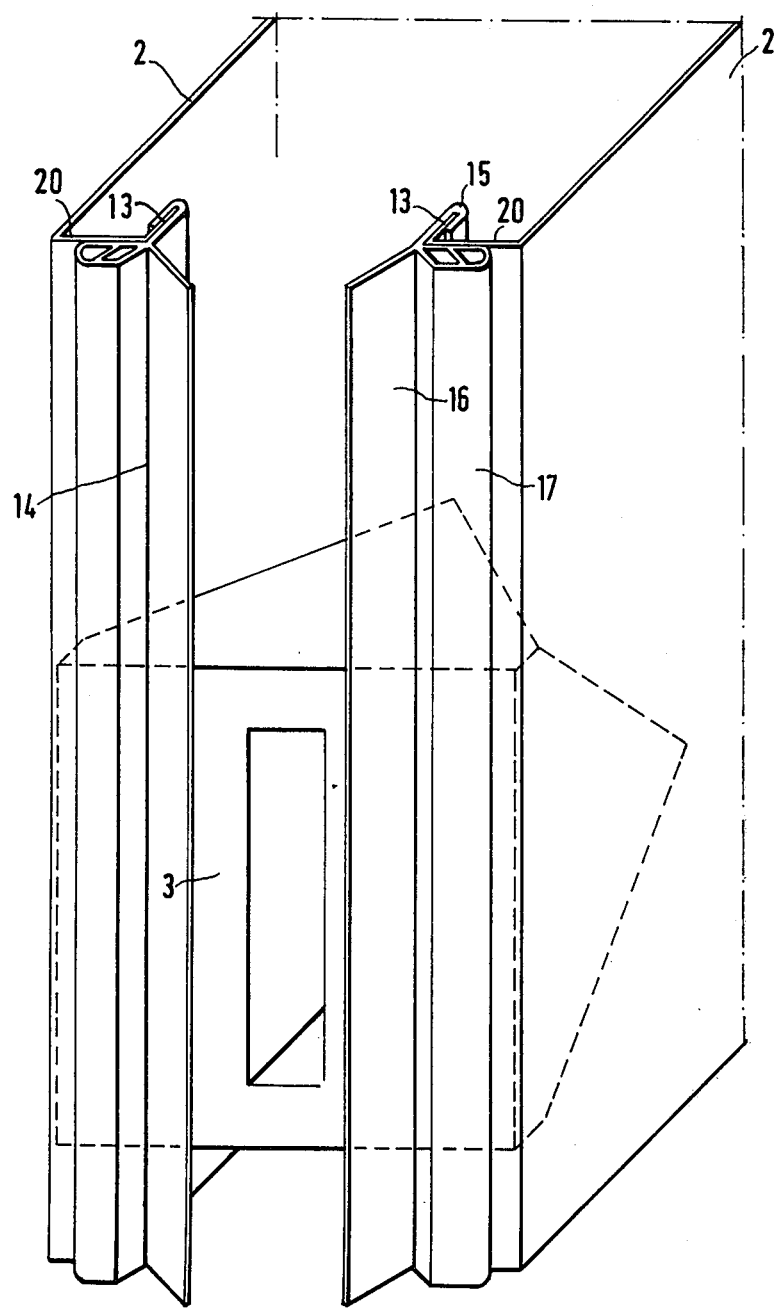

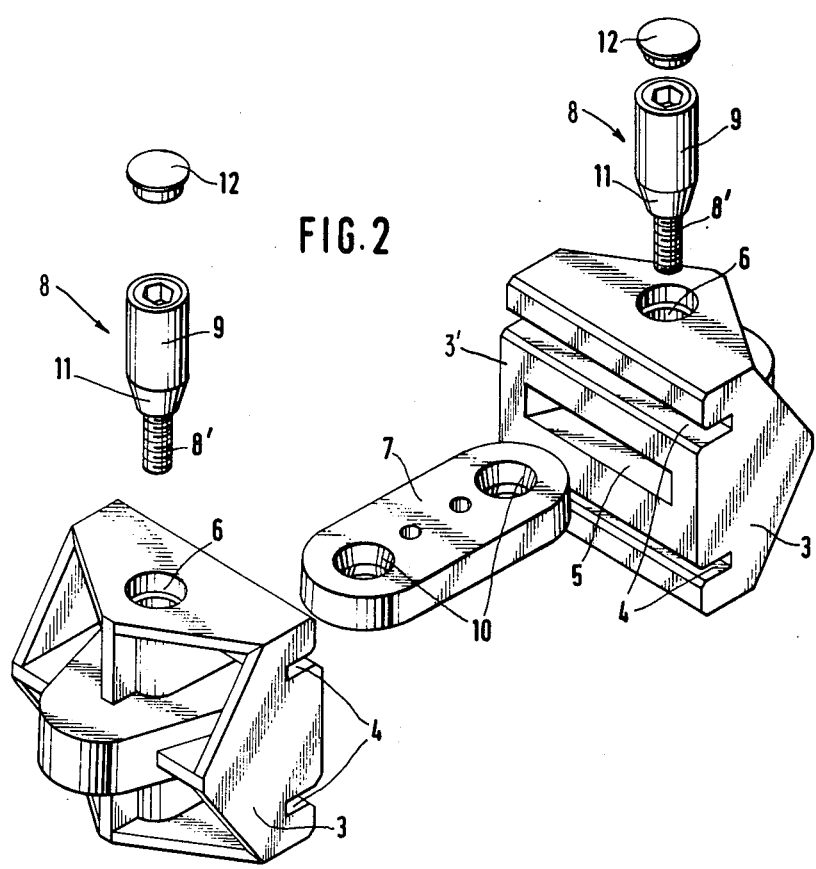

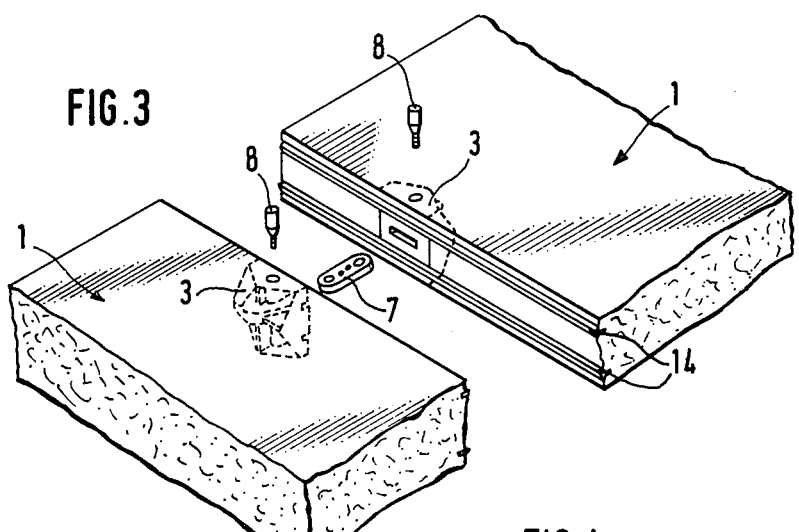
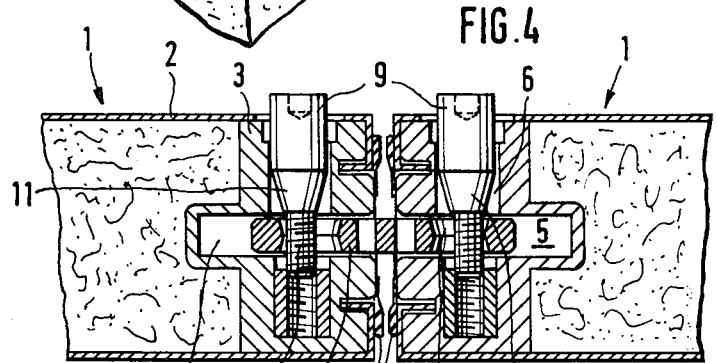
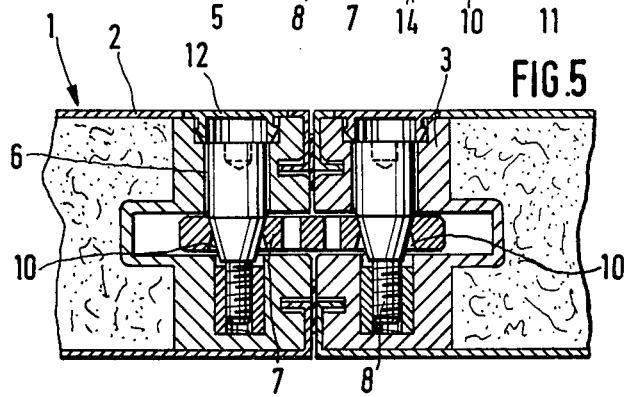

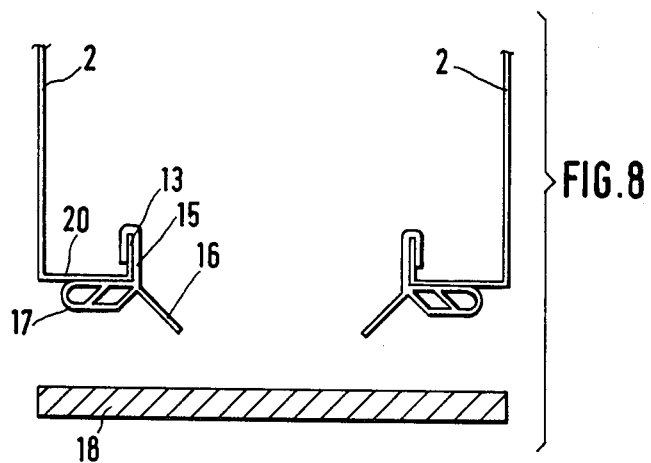
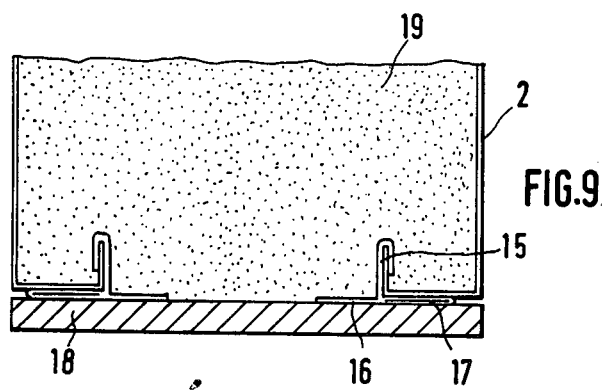
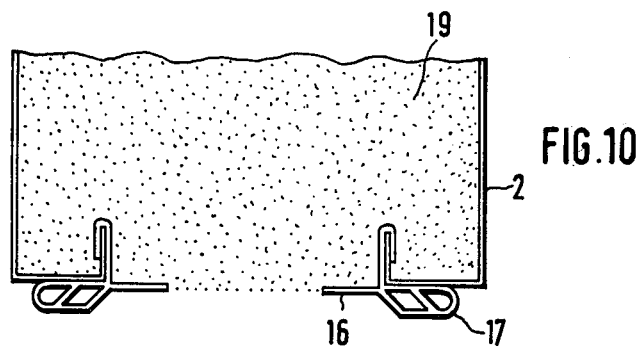

WALL CONSTRUCTION

BACKGROUND OF THE INVENTION

The present invention relates to a wall construction formed of interconnected panel sections and to panel sections for use in the wall construction, and has particular applicability to walls forming cold storage rooms.

Cold storage spaces for industrial use are presently constructed by joining a number of modular, thermally insulated panels to one another. Generally, the panels are constructed by the use of two juxtaposed metal plates, which define the body of the panel, polyurethane being injected between the plates and being bonded to the latter so as to form the panel.

For proper functioning of the cold storage space it is necessry to ensure that thermal insulation is maintained when the panels have been attached together, and that the insulating properties of the cold storage room are not adversely affected by poor sealing between adjacent panels.

One form of satisfying this requirement consists of attaching the panels to one another under pressure. However, in practice is it impossible to use conventional methods of attaching the panels to one another, and known forms of construction for attaching the panels together suffer from the disadvantage that the constructional elements employed are cumbersome, and the mode of construction of cold storage room or space from these constructional elements is difficult. Above all there is the difficulty that two different types of panels have to be made, one being equipped with female attachment members and the other with male attachment members.

SUMMARY OF THE INVENTION

With this in view there is now disclosed a novel way of attaching panels to one another, which entails applying a considerable pressure between the panels. The joint achieved between panels is extremely robust and of long service life, while at the same time the formation of the joint, and also the construction of the elements required for achieving it, is uncomplicated. It is a particular feature that the attachment means of one panel and the attachment means of the panel which is to be fixed thereto are identical, so that the panels equipped with the attachment means may be of a standard nature, whereby production can be improved.

According to one aspect of the invention therefore there is provided a wall construction comprising panel sections, joined by anchoring plates. Each anchoring plate has a frustoconical hole at each of its ends, the ends being disposed in anchoring side members mounted in respective ones of mutually juxtaposed panel sections. Connecting bolts are provided, each of which has an intermediate frustoconical portion and an end portion for screwthreaded engagement with a respective anchoring side member in mounted in a panel section. Each connecting bolt has its lower portion passed through the respective hole formed in the anchoring plate, whereby when the axes of the connecting members are offset relative to the axes of the holes in the anchoring plate their intermediate frustoconical portions engage the associated frustoconical holes of the anchoring plate subject to a certain degree of eccentricity. Thus, when the connecting bolts are fully screw engaged with respective anchoring side members the frustoconical portions of the connecting bolts are shifted relative to the holes in the anchoring plate; adjacent connecting bolts are moved towards one another; and the panel sections, associated with the connecting bolts are thereby drawn together to bear tightly against one another in assembly.

The practical efficiency of the above arrangement derives from the fact that a continuous pressure can be exerted between the panel sections, this pressure being greater than that which can be achieved using known forms of construction.

It is also necessary, when constructing a cold storage room or space using the above wall construction, to include sealing members, and to do so in two different phases of construction.

Firstly, it is necessary to provide some form of tight seal to prevent, during the injection of polyurethane between the panel members of the panel sections the polyurethane escaping in view of the fact that any escape of polyurethane would attach the outer surface of the panel members, thereby rendering the panel section unfit for use.

Secondly, when the panel sections are attached to one another, edge to edge, or corner portion to corner portion, some method of imparting a completely tight-sealed condition to the joint formed between the panel sections must be provided.

The problems which are posed by satisfying these requirements appreciably complicate the process whereby cold storage rooms are constructed, and are solved through the improvements offered in the present invention, the solution offered by the present invention also being applicable to the problem of effecting attachment between panels.

According to a pertinent aspect of the invention there is provided a panel section for a wall construction wherein the panel section is formed of two spaced panel members having peripheral edges extending towards each other to define a gap between them and delimit the edges or corner portions of the panel section, each peripheral edge being provided with sealing strips. These strips have two wing portions which are integral with and extend from a tongue portion engaging an inwardly bent portion of each peripheral edge of the panel members. The wing portions extend in opposite directions from one another, one of them forming substantially an outward resilient extension of the peripheral edge of each panel member, and the other wing portion being resiliently compressible, being a looped portion abutting against the inwardly bent portion of a respective panel member, and being utilizable in its compressed state as a means of providing a tight seal between coupled panel sections in assembly.

It is thus necessary to provide the necessary tight seal during all the stages of operation in which this seal is required, solely by the provision of the abovementioned sealing strips, juxtaposed panels being attached to one another in the above described manner. The ease and rapidity of operation which can thereby be achieved during the construction of the cold storage spaces or rooms will be clearly apparent, while the efficiency of sealing achieved by the new joint will in no way be adversely affected; indeed, this sealing efficiency may well be improved.

BRIEF DESCRIPTION OF THE DRAWINGS

The invention will now be described by way of example with reference to the accompanying drawings wherein:

FIG. 1 perspectively shows an edge portion of panel plates, sealing strips and a side member according to the invention;

FIG. 2 is an exploded perspective view illustrating elements for fastening the side member to another similar member.

FIG. 3 is a view perspective illustrating the juxtaposition of complete panels which can be attached together;

FIG. 4 is a cross-sectional view illustrating an intermediate range of interconnection of two adjacent panels.

FIG. 5 is a view similar to that of FIG. 4, but illustrates the panels when finally interconnected.

FIG. 8 is a cross-sectional view in which the assembly illustrated in FIG. 1 lies opposite the strip or plate against which it will abut while polyurethane is being injected.

FIG. 9 illustrates the roles performed by the sealing strips, during the injected of polyurethane, in the assembly referred to.

FIG. 10 is a cross-sectional view of a completed panel, the sealing strips being visible.

DESCRIPTION OF THE PREFERRED EMBODIMENT

Figure 11:
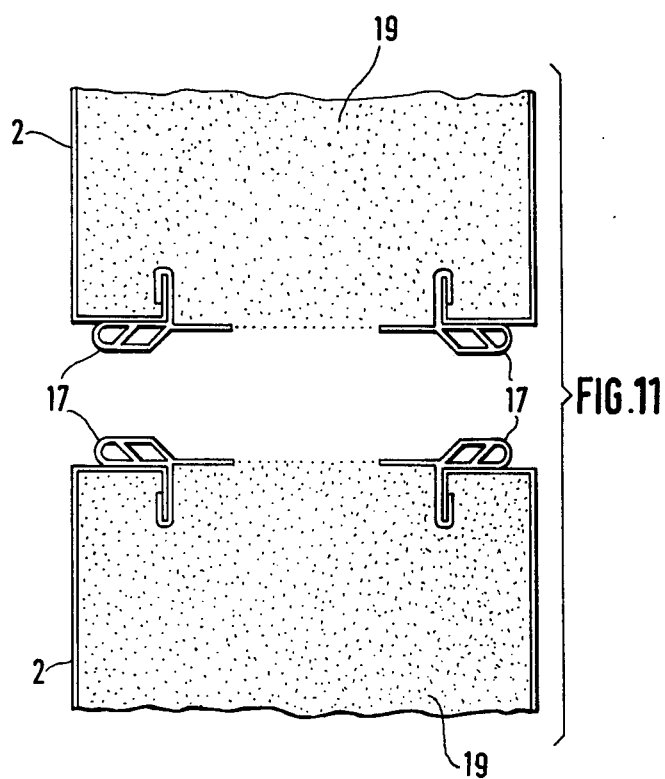
FIG. 11 depicts two mutually facing panels for attachment together at their opposed edge portions; the role of the sealing strips will become clear from FIG. 11.

With reference to the drawings and initially FIGS. 1 to 3 a panel 1 is constructed by juxtaposing two mutually similar panel plates or wall portions 2, which are made of metal or other suitable material, and spaced apart to define a gap or panel space between them. The space between the two panel wall portions, as shown is filled with an injected polyurethane 19 (FIGS. 9, 10, 11). Front surfaces of the panels are defined by the wall portions 2. Flanges 20, are provided on edges of the plates 2, that is to say in the regions in which the panels are interconnected. These regions may either be located at the mutually opposed edges of the panel (FIGS. 3–6) or at corner portions thereof (FIG. 7), according to whether the panels are to be attached to one another edgewise or by corner areas thereof. However, whichever of these two forms of joint is required, anchoring members or plugs 3 are employed in the area of mutual contact between the opposed flanges 20 of the panels to be joined together.

Resilient sealing strips 14 extend the whole length of rectangularly bent-over retaining tongues 13 of the flanges 20 of the strips, the sealing strips 14 thus running in pairs along the length of the area in which the juxtaposed panels are to be attached to one another. As illustrated in FIGS. 1 to 4 the panels are juxtaposed, and joined together, edgewise, although they may also be juxtaposed, and attached together, by their corner portions, so as to form a right-angled joint, FIG. 7.

Each of the tongues 13 comprises a cross-sectionally U-shaped retaining tongue portion 15, the respective retaining tongue 13 being bent over at right angles from the flange 20 into the space between the wall portions 2 concerned (FIG. 1), thereby securely anchoring the sealing strip 14 to the edge of the corresponding wall portion 2. Formed integrally with, and branching from, the U-shaped retaining tongue 15 of each sealing strip 14 are two further wing portions 16 and 17 outside of the space between wall portions 2. The wing portion 16 is constituted by a flat tongue which is an extension of flange 20 of a respective wall portion 2, and forms part of the portion of the panel which will be employed for effecting a joint with an adjacent panel, see FIG. 8. The other wing portion 17 of the sealing strip 14 is in the form of a closed loop and has a central rib, the wing 17 facing in the opposite direction to that of the tongue 16 and partially covering the flange 20 of a respective wall portion 2.

Closure plates 18 are placed against the opposed flanges 20 of the juxtaposed wall portions 2, and polyurethane is then injected into the gap between them (FIG. 8). During injection of polyurethane sealing strips 14 prevent the escape of polyurethane from the gap. The wings 16 of the sealing strips 14 are pressed against the polyurethane 19 subject to the pressure exerted by the plate 18. For this reason, and also due to the fact that the wings 16 are integral with the U-shaped retaining tongue 15 of the sealing strips 14 liquid polyurethane will be unable to escape between the plate 18 and the retaining tongues 13 of the wall portions 2. At the same time the wing 17 of the sealing strips 14 will be compressed between the retaining tongues 13 of the wall portions 2 and the closure plate 18, thereby preventing the escape of polyurethane both between the wings 16 of the sealing strips and the closure plate 18 and between the U-shaped retaining tongue 15 of the sealing strip 14 and the rectangularly bent-over tongue 13 of the flange 20 of respective wall portions 2. The co-operation of all the parts, provided for preventing any leakage of polyurethane from the panels, is clearly illustrated in FIGS. 8, 9 and 10.

When a panel has been formed in this way and when closure plate 18 has been removed, the wings 16 of the sealing strips 14 will remain embedded in position at the edge of the polyurethane filling 19, thereby defining part of the edge of a completed panel or, where appropriate, of the corner portion of the panel. The other wings 17 of the sealing strips 14 will resiliently expand after removal of closure plate 18, whereupon they act as sealing joints (FIG. 11) which can be used for imparting a tight-sealed condition between adjacent panels which have been juxtaposed, and attached together, edgewise or with a view to forming a right-angled joint, by their corner portions. Thus, when these adjacent panels are attached together, the wings 17 of the sealing strips 14 will be resiliently compressed and thus ensure that the joing between adjacent panels will be tightly sealed.

For effecting edge to edge attachment of two juxtaposed panels 1, the latter are provided with a number of connecting or anchoring members or plugs 3 in the region of the edges to be joined together. If a right-angled joint is to be formed (FIG. 7), then anchoring member or plug 3 of one panel are positioned in corner regions of a plate or wall portion 2 of one of the juxtaposed panels. The anchoring members 3 are made of synthetic plastics material, and are formed with generally flat faces 3' (FIG. 2), which in use are parallel to, and desirably aligned with, the flanges 20 of the wall portions or plates 2. Face 3' has two parallel grooves 4, for receiving the retaining tongues 15 of the wall portions 2 of each panel 1. Anchoring members 3 of one panel 1 are aligned with the corresponding anchoring members 3 of the adjacent panel 1, so that these juxtaposed panels can be attached to one another by means of these opposed pairs of anchoring members 3.

The anchoring means 3 each have a blind opening 5 recessed into face 3', and a transverse through aperture 6, which extends through member 3 parallel to face 3' and also extends at right angles to, and through the opening 5. Thus, the opposed openings 5 of the juxtaposed pair of anchoring members 3 together define a continuous opening, through which extend separate transverse aperatures or orifices 6.

Figure 6:
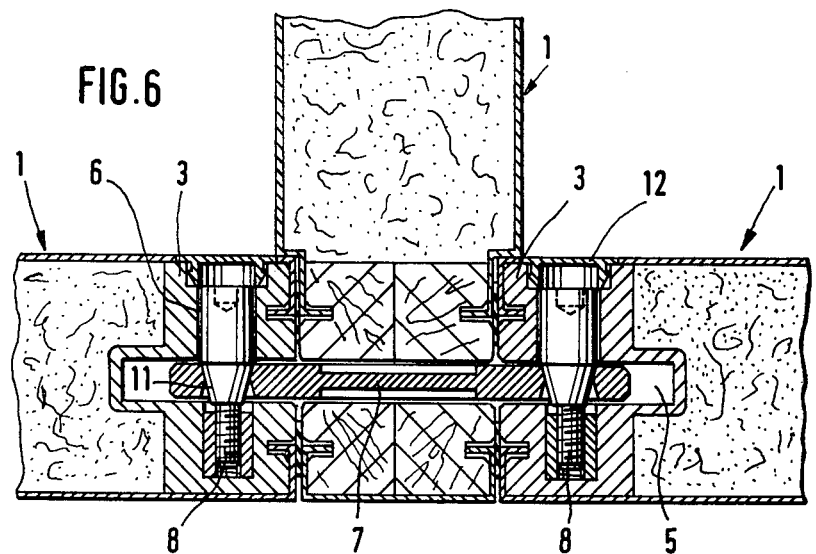
FIG. 6 is a cross-sectional view illustrating the manner in which three panels can be connected, in the form of a right-angled joint.
Figure 7:
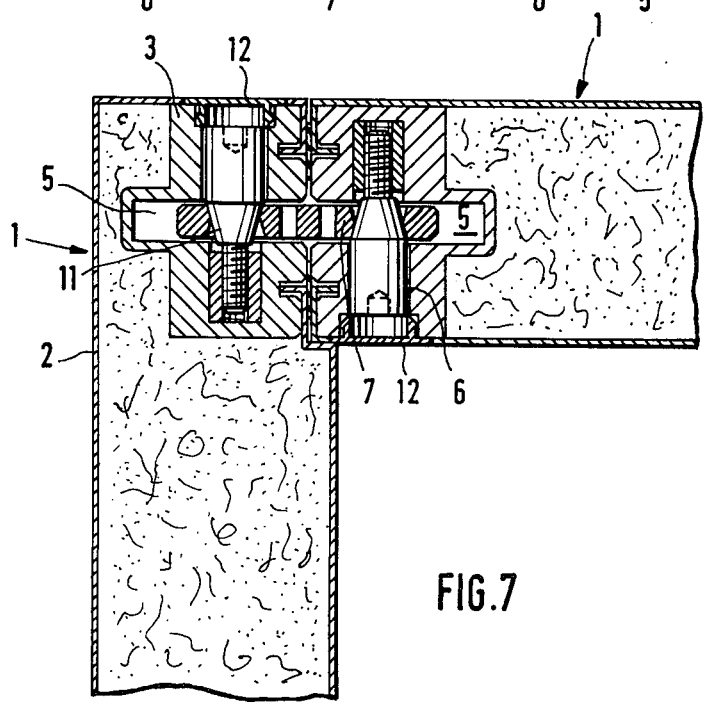
FIG. 7 is a cross-sectional view illustrating a right-angled joint formed by two juxtaposed panels.

Anchoring or retaining plates 7 are positioned in the openings 5, so that each bar 7 has each of its ends engaged in a respective one of two juxtaposed panels; more specifically, the ends of bars 7 engage in the members or plugs 3 associated with the mutually juxtaposed panels. Each bar 7 is provided with two terminal holes 10, and each hole 10, as shown in FIGS. 4 to 7, is bevelled or frustoconical in both lateral directions, so that the retaining bars or plates 7 can be employed for effecting a joint in which the adjacent panels are juxtaposed by their mutually co-operating corner portions when an angled joint is to be obtained (FIG. 7), or edge to edge when a rectilinear joint is to be obtained (FIGS. 4 to 6). Each of the retaining bars or plates 7, as shown, is fully accommodated and enclosed in the respective continuous openings 5,5 of the anchoring members or plugs 3, when the assembly is completed (FIG. 5).

Studs or bolts 8, having screwthreaded studs 8' are placed in the holes 6 of the anchoring members or plugs 3, each stud 8 passing through the co-operating holes 10, formed in the retaining bar or plate 7, and having an enlarged, unthreaded, cylindrical body portion 9 and, between this body portion and the screw-threaded end 8', and intermediate part 11 tapering between the enlarged body portion and the screw-threaded end. As is apparent from FIG. 4, when the two juxtaposed panels are being attached to one another and the studs 8 are being introduced, the axes of these studs 8 are offset from the axes of the associated holes 10 of the retaining plate 7. Consequently, when studs 8 are downwardly screwed into position, their frustoconical portion will slide, in an inclined plane, against the conical portions of the holes 10, formed in the retaining bar or plate 7, and this sliding motion will also cause the studs 8 to be moved sideways and to be centered in the holes 8 formed in the anchoring pluts 3. Thus the two studs are drawn towards one another, with the result that the anchoring members 3, and thereby the mutually juxtaposed panels 1, will be drawn towards one another by the same amount until they bear against one another with the required pressure, see FIG. 5.

In instances where two mutually juxtaposed panels engage, between them, a partition wall (FIG. 6), the joint effected only differs from those described in the previous embodiments in that the retaining plate 7 is longer so as to compensate for the increasing space occupied by the panel or partition wall interposed between the juxtaposed panels 1. As in previous embodiments, the effectiveness of the sealing strips 14 in the construction for example of a cold storage room will be apparent from FIG. 6.

Top cover elements 12 are provided for closing off and therefore concealing the holes through which the studs 8 are introduced into the panels.

What we claim is:
1. A wall, comprising;
a plurality of wall panels, each comprising first and second panel plates generally similar to one another and juxtaposed and spaced apart to define a panel space between them, each panel plate having an edge, a flange extending from the edge toward an adjacent edge of the other panel plate, and a bent portion of the flange extending from an edge of the flange, parallel to the edge of the plate, into the panel space;
a connecting member disposed between the first and second panel plates of each wall panel opposite a similarly disposed connecting member of an adjacent wall panel, each connecting member having a face parallel to the respective flanges, having two mutually parallel grooves in the face, receiving one of the bent portions in each groove, and being thereby secured to the respective wall panel, each connecting member also having a blind opening recessed into the face and a through aperture extending transversely of and through the member in the area of the blind opening;
an anchoring bar for each pair of mutually opposite connecting members, each bar having two end portions, one in each blind opening, each end portion having a bevelled hole; and
a pair of connecting bolts for each anchoring bar, each bolt having: a screw-threaded end threadedly engageable with the respective connecting member on one side of the respective blind opening, a frustoconical bolt portion flaring out from the end, and an enlarged body portion extending away from the flaring portion, the enlarged body portion having a diameter substantially equal to the maximum diameter of the bevelled hole, and the flaring portion being normally engageable with the respective bevelled hole, to permit insertion of the bolts, through the anchoring bar, when the panels are slightly spaced apart, and to enable the bolts, when fully threaded into the respective connecting member, to draw the panels together to bear tightly against one another.

2. A wall according to claim 1 in which the face of each connecting member is aligned with the respective flanges, and the anchoring bar is substantially fully enclosed in the respective blind opening when the connecting bolts are fully threaded into the respective connecting member.

3. A wall according to claim 1 in which the flange of each panel plate has a flexible seal strip, in addition to the bent portion, extending from the edges of the flange, away from the panel space.

4. A wall according to claim 3 in which the seal strip comprises wing portions extending in opposite directions from one another, at least one of the wing portions being resiliently compressible to provide a seal between the panels bearing tightly against one another.

5. A wall according to claim 3 in which the bent portion has a tongue folded over to provide a cross-sectional U-shape of the bent portion and thereby to promote the securing of the connecting member to the wall panel.

6. A wall according to claim 1 in which the hole of each end portion of the anchoring bar is frustoconically bevelled on both sides of the bar, to facilitate utilization of the bar regardless of the side thereof from which a connecting bolt is threadably engaged with the respective connecting member.

7. A wall panel, comprising two mutually parallel panel plates generally similar to one another, juxtaposed and spaced apart to define a panel space between them, each panel plate having an edge, a flange extending from the edge toward an adjacent edge, a flange extending from the edge toward an adjacent edge of the other panel plate, and a bent portion of the flange extending from an edge of the flange, parallel to the edge of the plate, into the panel space, and at least one of the panel plates having an aperture adjacent the edge thereof;

a connecting member disposed between the first and second panel plates, the connecting member having a face parallel to the respective flanges, having two mutually parallel grooves in the face, receiving one of the bent portions in each groove, and being thereby secured to the panel plates, the connecting member also having a blind opening recessed into the face and a through aperture extending transversely of and through the member in the area of the blind opening and of the aperture of the panel plate;

an anchoring bar having an end portion in the blind opening, the end portion having a bevelled hole; and a connecting bolt insertable in the connecting member and anchoring bar through the aperture of the panel plate for connecting the anchoring bar to the connecting member, the bolt having a screw-threaded end threadedly engageable with the connecting member in a threaded part of the through aperture, a frusto-conical bolt portion flaring out from the end, and an enlarged body portion extending away from the flaring portion, the enlarged body portion having a diameter substantially equal to the maximum diameter of the bevelled hole, and the flaring portion being normally engageable with the bevelled hole, to permit the insertion of the bolt in the anchoring bar when the panel is slightly spaced apart from a similar panel and connecting member, and to enable the bolt when progressively threaded into the threaded part to move the connecting members together for causing the panels to bear tightly against one another.

8. A device for interconnecting wall panels, comprising;

a connecting member disposed between first and second panel plates of a wall panel opposite a similarly disposed connecting member of an adjacent wall panel, the connecting member having a face which can be disposed parallel to an edge of respective panel, the member having two mutually parallel grooves in the face for receiving a bent portion of a flange of the panel in each groove, and for being thereby secured to the respective wall panel, the connecting member also having a blind opening recessed into the face and a through aperture extending transversely of and through the member in the area of the blind opening; an anchoring bar having an end portion, in the blind opening, the end portion having a bevelled hole; and a connecting bolt for connecting the anchoring bar to the connecting member, the bolt having a screw-threaded end threadedly engageable with the connecting member on one side of the blind opening, a frusto-conical bolt portion flaring out from the end, and an enlarged body portion extending away from the flaring portion, the enlarged body portion having a diameter substantially equal to the maximum diameter of the bevelled hole, and the flaring portion being normally engageable with the bevelled hole, to permit insertion of the bolt, through the anchoring bar, when the panel is slightly spaced apart from a similar panel and connecting member, and to enable the bolts, when fully threaded into its connecting member, to draw the panels together to bear tightly against one another.

* * * * *